United States Patent [19]
Herzig

[11] Patent Number: 5,850,080
[45] Date of Patent: Dec. 15, 1998

[54] VERIFICATION OF BARCODES

[75] Inventor: John Herzig, Toronto, Canada

[73] Assignee: Barcode Graphics Inc., Toronto, Canada

[21] Appl. No.: 510,738

[22] Filed: Aug. 3, 1995

[51] Int. Cl.$^6$ .............................. G06K 7/10; G06K 19/06
[52] U.S. Cl. ........................ 235/494; 235/456; 235/462
[58] Field of Search .................................. 235/462, 437, 235/494, 436, 438, 463; 400/64, 73, 74, 103, 104, 105, 106

[56] References Cited

U.S. PATENT DOCUMENTS

| | | | |
|---|---|---|---|
| 4,449,052 | 5/1984 | Krieg | 235/462 X |
| 5,069,556 | 12/1991 | Sasaki et al. | 400/74 |
| 5,123,352 | 6/1992 | Luttrell | 101/375 |
| 5,218,190 | 6/1993 | Hardesty et al. | 235/462 |
| 5,413,419 | 5/1995 | Oami et al. | 400/61 |
| 5,451,990 | 9/1995 | Sorenson et al. | 347/37 |

FOREIGN PATENT DOCUMENTS 0403376A 12/1990 European Pat. Off. .
0116943A 8/1994 European Pat. Off. .

*Primary Examiner*—Donald T. Hajec
*Assistant Examiner*—Thien Minh Le
*Attorney, Agent, or Firm*—Ridout & Maybee

[57] ABSTRACT

Verification patterns are associated with barcodes to provide rapids visual confirmation that a barcode is printed within acceptable tolerances. A master of a barcode to be produced includes at least one verification pattern including a wedge formed by an unprinted area or areas bounded by a printed area or areas. During reproduction, an anticipated degree of ink-spread will cause a predetermined degree of shortening of the wedge, while abnormal degrees of shortening are an indication of press and/or pre-press errors and/or an inappropriately specified master. With a suitably dimensioned wedge, compliance with bar and space width tolerances can be assessed. Two types of verification patterns may be used in conjunction with a single bar code to enable detection of different types of errors.

20 Claims, 5 Drawing Sheets

VERIFICATION OF BARCODES

BACKGROUND OF THE INVENTION

1. Field of the Invention

The present invention relates to the reproduction of barcodes and more particularly to the pro-vision of means for detecting whether certain characteristics of the reproduced barcode fall within specified tolerances.

2. Description of the Background Art

The UPC or Universal Product Code is very widely used in the retail and wholesale trades, usually being applied to packages or labels in the form of a printed barcode which is machine readable by suitable scanners. The barcode also incorporates the U.P.C. in human readable form along a lower margin so as to permit manual entry of the code in the event of a scanning failure. The U.P.C. in barcode form is used extensively in inventory management, and point-of-sales (POS) systems. Further details of the U.P.C. specification will be found in the "U.P.C. Symbol Specification Manual" published by Uniform Code Council, Inc. (1986). Many retailers now penalize suppliers heavily if a barcode does not scan properly. In some cases, retailers refuse to order stock from a supplier when barcode errors have occurred too many times, resulting in significant losses for the supplier. The supplier in turn may penalize a printer for defectively printed barcodes. The extent of the problem is discussed in articles by the inventor published in the trade journal "Canadian Packaging", namely "The Get-Tough Approach" (May, 1992); "UPC Barcodes and the Desktop Revolution" (February, 1993); and "Desk-top Barcodes Revisited" (May, 1994).

Barcodes are also used to encode many other types of data where machine readability of such data from printed material is required, and accurate printing of such data is essential to readability. There are many factors that can compromise the readability of barcodes during scanning, most of which involve distortions introduced during press and pre-press operations used to apply the barcode to a substrate, and substrate based problems. Additionally, the master from which the barcode is reproduced may be incorrectly specified, e.g it may have been prepared for a different printing process from that actually used.

Various methods are used to ensure that the widths of the bars and spaces within a printed barcode are within specified tolerances, which must deviate no more than ±0.0014 inch in an 80% U.P.C. barcode. To this end, a "printability gage" as outlined in the U.P.C. Symbol Specification Manual has been used, but can lead to imprecise results for a variety of reasons. Moreover, on small items there may be insufficient space to have the test pattern in close proximity to the bar code, or even on the package thus rendering it effective. More recently, "verifier" devices such as disclosed in U.S. Pat. No. 5194720 have been used for measuring the accuracy of the printed barcode, but these devices require considerable training, are quite expensive, and some of the problems identified by the device are the result of problems other than lack of printing accuracy of the printed barcode. A discussion of verifier use and design is found in Part II and III of the "Quality Specification for the U.P.C. Printed Symbol", published by the Uniform Code Council, Inc., Dayton, Ohio 1993.

SUMMARY OF THE INVENTION

The present invention addresses certain of the above noted problems by providing a set of test patterns in a master used in the reproduction of barcodes on a substrate, to indicate whether distortions such as ink spread/gain, plate distortion, over-exposed press plates, ink fountain settings, and any other fault capable of distorting the widths of bars and spaces in a barcode, have occurred to an extent such as to bring the reproduced barcode out of specification. "Master" in the context of the present invention includes not only conventional film-masters, but also electronic masters such as EPS files, recorded on suitable data storage media, in which the master barcode is defined by a page description language such as the "POSTSCRIPT"™ language.

The most pervasive cause of failure of printed barcodes to scan is the spreading of bars (or spaces in reverse printed barcodes) such that the relative proportions of the bar and space width are out of tolerance Most printing processes result in some degree of ink-spread, the extent of which is normally predictable within a range for a given print job and equipment. The predicted ink-spread is allowed for in the production of a master by a corresponding reduction in width of the lines to be printed, known as line width reduction or LWR. In addition to this spread during a press operation, which causes either the bars or -he spaces to spread and encroach on the other, various errors, such as over-exposure of press plates, may occur during pre-press operations and can affect the degree of spreading or encroachment.

The invention seeks to provide a means for verifying that the spreading of bars in printed barcodes (or spaces in reverse printed barcodes) is within tolerance. In a preferred form, it also provides an independent check that line width reduction is within a range for which the master was specified to avoid situations in which an incorrect line width reduction invalidates the tolerance indication.

Accordingly, in its broadest aspect, the present invention provides a master for the production of scannable barcodes comprising a scannable area of parallel bars and spaces and requiring the maintenance of bar and space widths within a predetermined tolerance after reproduction by a process in which one of the bars and the spaces is subject to spreading result-ng in encroachment on the other of the bars and spaces, said master including, adjacent the scannable area, at least one verification pattern including a first component, corresponding to whichever of the bars and the spaces is subject to encroachment, bounded by a second component, corresponding to whichever of bars and spaces is subject to spreading, the first component being at least one wedge having portions with widths graded through a range of widths such that, during reproduction, spreading of the second component to a degree within a predetermined range will shorten the wedge to an extent indicative of the degree of spreading, whereby an abnormal extent of shortening of the wedge provides a visual indication of abnormal reproduction.

The invention extends to substrates carrying a barcode reproduced from such a master.

Preferably the master includes as least one verification pattern of a first type in which the range of widths through which the first component is graded extends from a line width reduction allowed for in the master to the sum of the tolerance and the line width reduction. Such a verification pattern provides, in most circumstances, a fairly reliable visual indication of whether bar and space widths within the code are within tolerance, bearing in mind that most divergences from nominal are in the direction of excessive spread. Certain errors, such as an incorrectly specified master, can provide effects which tend to invalidate the indications given by such a verification pattern, thus giving a misleading indication. An indication that spread is within a normal range is also desirable. It is therefore preferred to include an additional verification pattern in which the range of widths through which the first component is graded extends through a range of acceptable degrees of ink spread of the second component, centred on an anticipated degree of ink spread. Such a pattern provides an additional test of whether ink-spread is within an expected range in a printed barcode which the primary verification patterns indicate to be satisfactory. If this additional pattern indicates an abnormal condition, then the reliability of the indication given by the primary pattern is suspect. On its own, the additional pattern is not an absolute measure of ink-spread, nor of compliance with tolerances, but its abnormal reproduction is an indicator of reproduction problems.

With such a verification pattern or patterns present, visual inspection and a limited knowledge regarding interpretation are all that is generally required in order to identify out-of-tolerance barcodes after reproduction. It is also possible to spot problems arising during a printing run and to take corrective action.

While the following description is directed primarily to verification patterns for U.P.C. barcodes, application of the invention to other barcode -formats will be readily achieved by those skilled in the art.

DETAILED DESCRIPTION OF THE PREFERRED EMBODIMENTS

Barcodes are generally reproduced from a master by a printing process, involving pre-press and press operations, directly onto a substrate such as a package, or a label. Reproduction may be by direct printing of the bars onto the substrate which provides a background of spaces between the bars Should ink spreading occur, it is the spaces between the bars that are encroached upon by the ink and reduced in width as the bars spread. Alternatively, in reverse printing, the background provides the bars, and the ink defines the spaces between the bars. Should ink spreading occur, it is the bars that are encroached upon and reduced in width as the printed spaces spread.

Ink spread during press operations is not the only error that can effect the widths of the bars and spaces. Errors in pre-press operations such as over- or under-exposure of plates can also effect reproduction.

While the following description assumes the use of film-masters, since these readily illustrate in their original form the features of the invention, it should be understood that the invention extends to masters stored on other media, such as magnetic or optical disks, in digital form, for example as EPS files in which the master barcode is defined by a page description language such as the POSTSCRIPT™ language. Such electronic masters are full functional equivalents of traditional masters.

UPC film-masters are precise tooling films that are designed to produce accurately printed UPC barcodes. Film-masters are produced on an appropriate scale to provide the size required on the final package, and the bar and space dimensions therein are held too very high tolerances (±0.0002"). Such masters are individually produced to compensate for gain with a specified degree of line width reduction (LWR) so that appropriate allowance is made for anticipated ink-spread and other anticipated distortions. Bar width adjustment or line width reduction (LWR) is primarily intended to compensate for the ink-spread which occurs in all printing processes, and may typically reach 0.0015 inch in lithographic printing. In practice, the actual degree of spread will vary within a range: the acceptable limits of this range will vary according to circumstances. A reasonably narrow range is essential since the line and space widths in a printed 80% U.P.C. barcode must deviate by no more than 0.0014 inch for the barcode to be within specification. If spread can not be adequately controlled in any particular printing process, it is unsuitable for printing barcodes. Other barcodes may have different tolerances, but the general principles are the same.

Figure 1:
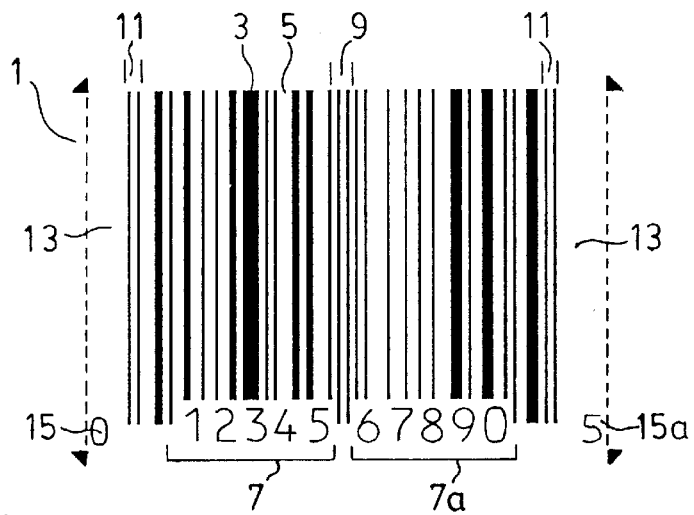
FIG. 1 shows a typical a prior art barcode such as used to encode a UPC.

FIG. 1 shows a prior art standard UPC barcode 1. The barcode is comprised of n parallel bars 3 of varying width and n−1 spaces 5 of varying width between them. Groups 7 and 7a of human readable numeric characters are disposed to both sides of the tall centre guard bars 9, and located to either side of the left and right guard bar patterns 11 which provide the data start and data stop boundaries of the barcode data. The two numeric character groups 7 and 7a provide manufacturer information and product information respectively. Located to the outside of the guard bars 11 are the left and right respective light margins or quiet zones 13. The numeric figure indicated by reference numeral 15 in the left light margin provides a human readable reference to the numbering system employed for the encodification, and the numeric figure indicated by the reference numeral 17 in the right light margin provides a human readable reference to a check digit for the code.

Figure 2:
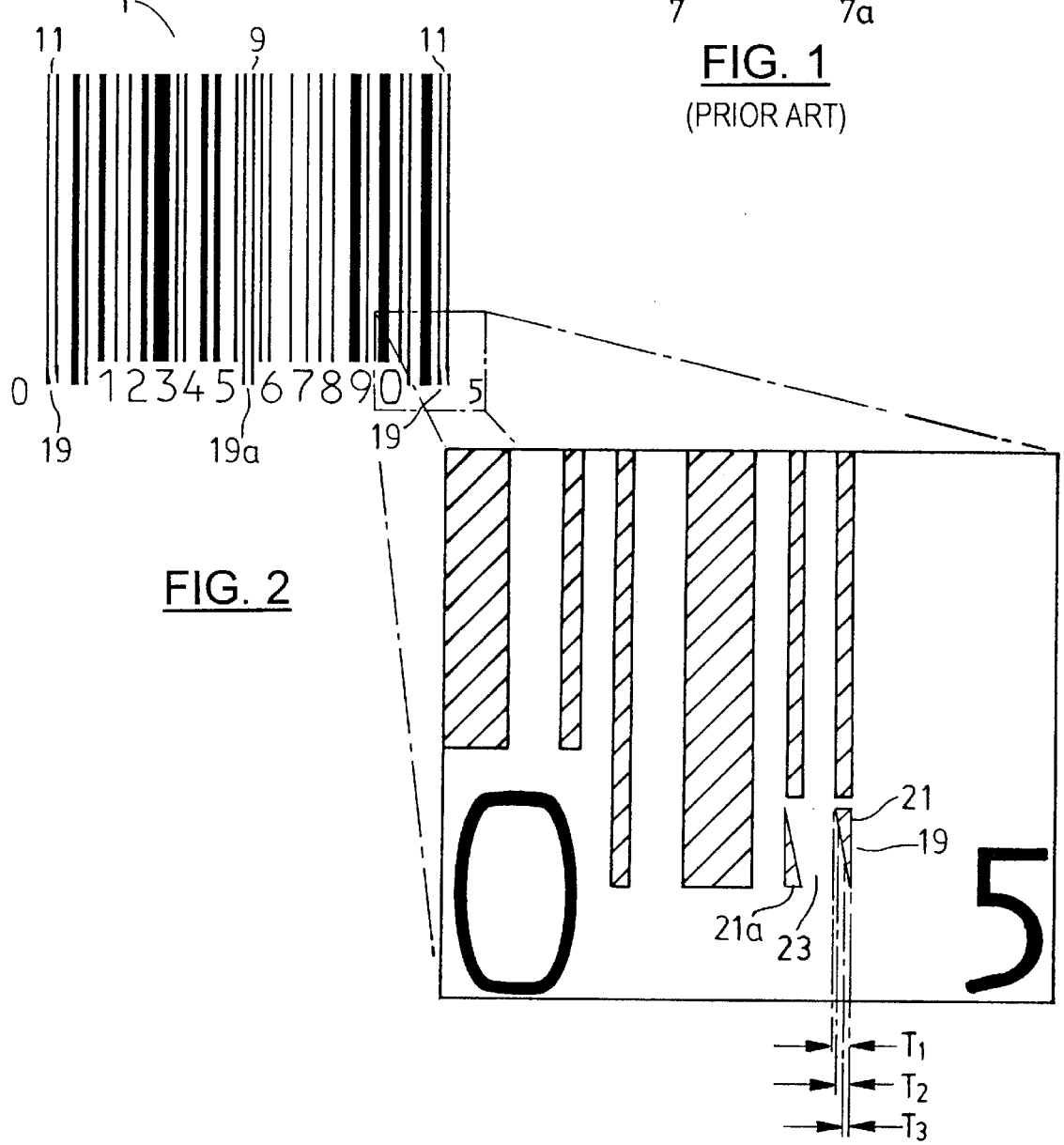
FIG. 2 is a film-master for a reverse printed barcode and a detail of one of the two types of verification pattern included therein, according to one embodiment of the present invention.

FIG. 2 shows a film-master for reverse printing. Two verification patterns 19 of a first type and one verification pattern 19a of a second type, are disposed in the lower extensions of the guard bars 11 and the centre guard bars 9 respectively. The detain of FIG. 2 shows the right hand verification pattern on an enlarged scale. The pattern comprises two spaced wedge-shaped bars 21 and 21a which comprise a first component of this verification pattern for reverse printed barcodes. A second component, in this example the space 23 surrounding the two bars of the first component, is subject, like the spaces between the bars, to spreading during reproduction causing a reduction in the width of the bars. Each bar of the first component presents a face which is angularly disposed with respect to the longitudinal orientation of the bars to form a wedge.

Figure 3:
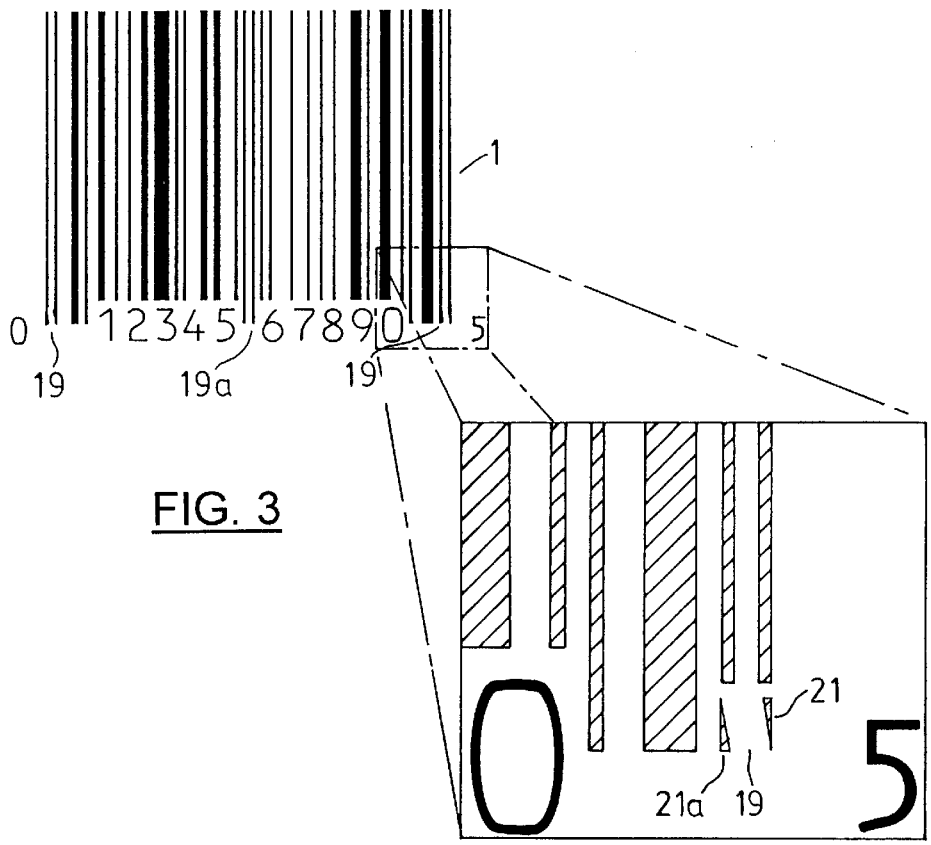
FIG. 3 is an in-tolerance reverse printed barcode reproduced from the film-master of FIG. 2, including a detail of the same verification pattern.
Figure 4:
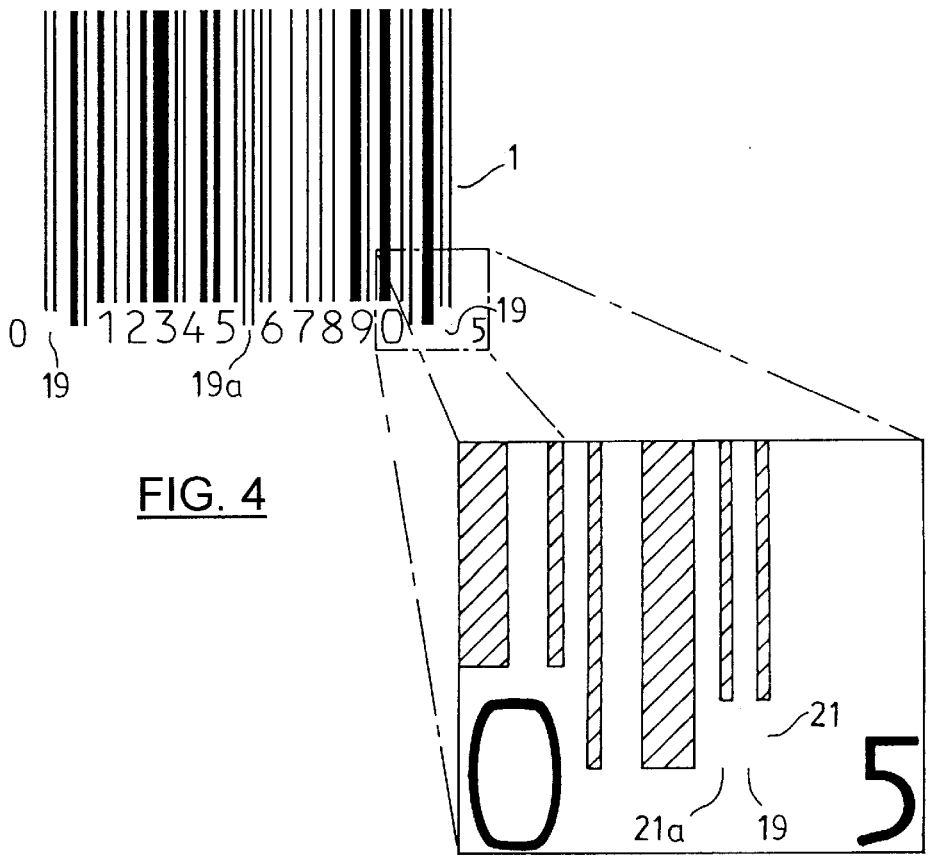
FIG. 4 is an out-of-tolerance reverse printed barcode reproduced from the film-master of FIG. 2, including a detail of the same verification pattern.

The width of each wedge decreases through a range encompassing widths $T_1$, $T_2$, and $T_3$. $T_3$ represents the LWR provided for in the master. Assuming a degree of ink spread exceeding $T_3$ during reproduction, the width of the wedge will be reduced, for example to T., and the wedge will be shortened, somewhat as shown in FIG. 3, which illustrates a barcode which is acceptably printed although the ink-spread somewhat exceeds that allowed for in the master. The width $T_1$ represents the sum the LWR allowed for in the master, and the barcode tolerance. If the wedge is shortened due to ink-spread or other gain exceeding $T_1$, i.e. it disappears as shown in FIG. 4, which also shows a reproduced barcode, then the reproduced barcode is out of tolerance.

Correct reproduction of the verification patterns 19 does not of itself guarantee that the barcode bar and space widths are within tolerance, since other errors can in certain cases cause a false indication. For example, use of a master prepared for a different printing process and incorporating an inappropriate LWR might provide a false indication that a printed code was within tolerance since the tolerance would be referenced to an incorrect line width reduction. To detect this type of problem, an additional verification pattern 19a is provided, which is generally similar to the patterns 19 except that the range of bar widths of the wedges is different, extending from a width equal to a minimum expected degree of ink-spreader through a width equal to the LWR and up to a width equal to a maximum expected degree of ink-spread associated with the intended printing process, with a width equal to the LWR at approximately its centre point. If pre-press operations are free of error, reproduction of the wedges will indicate how ink-spread during printing compares with that anticipated by the LWR in the master, since exactly the anticipated ink-spread will result in half-length wedges, variations within the expected range will cause greater or lesser shortening, abnormally high ink-spread will obliterate the wedges, and abnormally low ink spread will blunt their narrow ends. Such abnormal indications mean either that there is a serious problem in the printing process, or that the LWR in the master is incorrect: for example the master may have been prepared in contemplation of a different printing process or parameters Thus, abnormal reproduction of pattern 19a, even in conjunction with apparently acceptable reproduction of the patterns 19, will provide a warning that significant errors have occurred during the printing process, that correction is desirable, and that the indications of the patterns 19 may not be a reliable assurance of a scannable barcode.

In an ideally reproduced barcode, the wedges in the pattern 19a will be shortened to approximately the same degree, and the wedges in the patterns 19 will be visible, a condition readily verified visually with the aid of a low powered loupe. The degree of shortening of the wedges 19 indicates how far spread has exceeded the LWR allowed for in the master, even if the code is still within tolerance, Most errors will be in the direction of excessive spread. The degree of shortening of the wedges 19 and 19a is a characteristic well adapted to measurement by automated means such as those utilizing electronic pattern recognition techniques.

Figure 5:
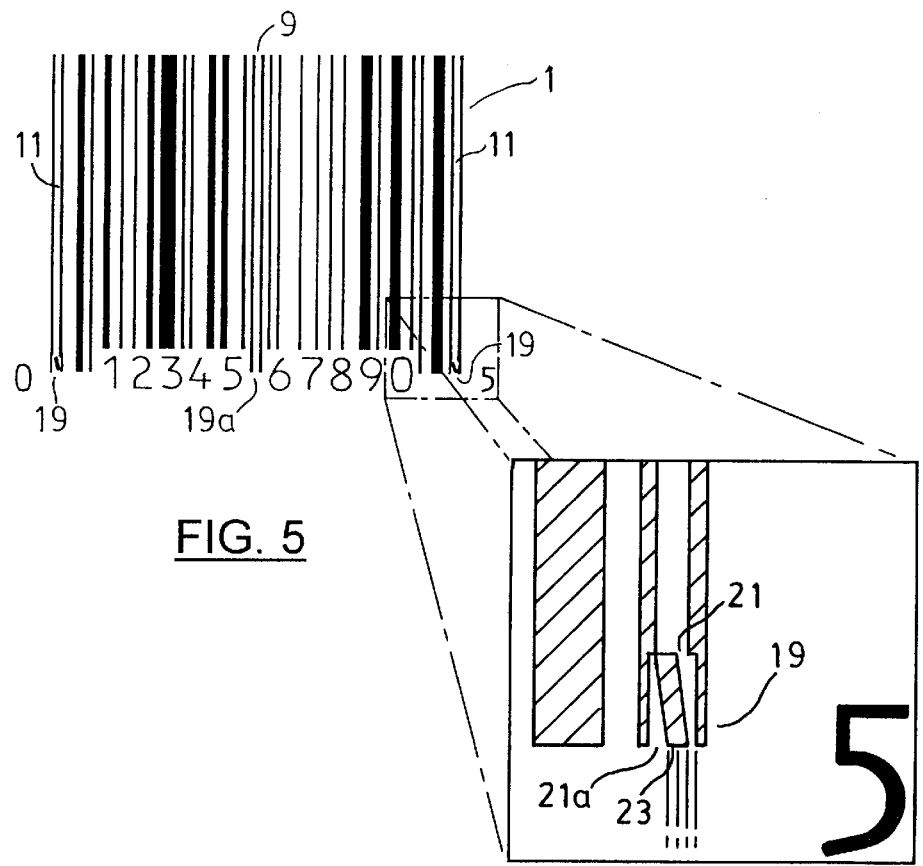
FIG. 5 shows a film-master employing a different set of verification patterns in accordance with the present intention, including a detail of one verification pattern.
Figure 6:
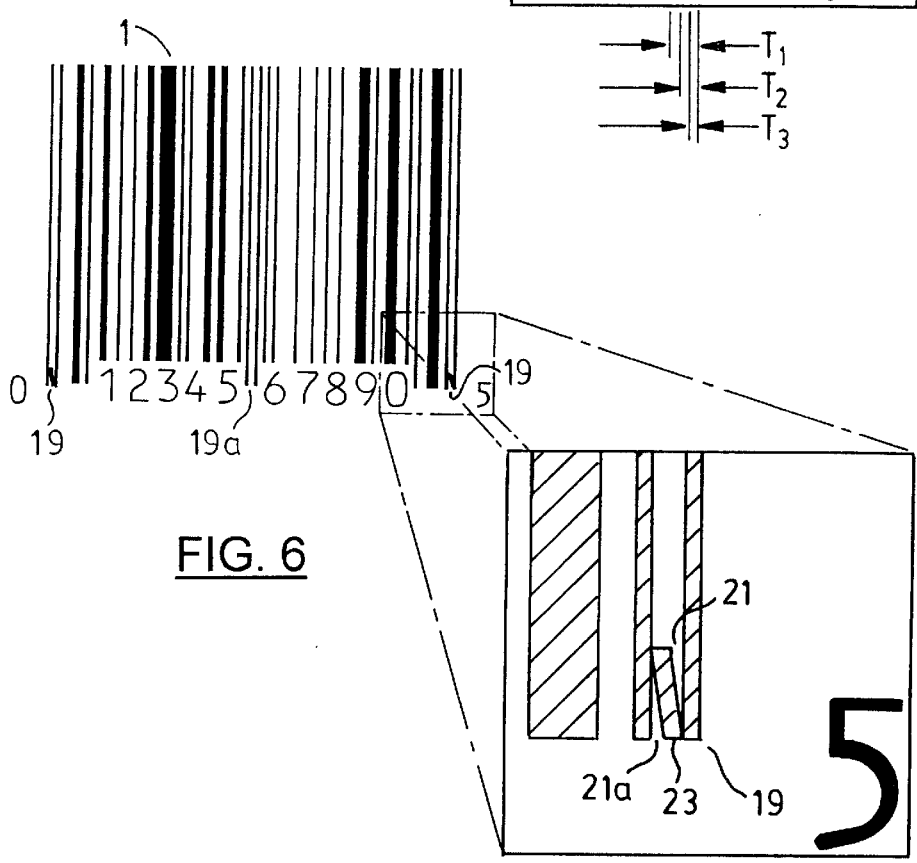
FIG. 6 shows an in-tolerance normally printed barcode reproduced from the master of FIG. 5, including a detail of one verification pattern.
Figure 7:
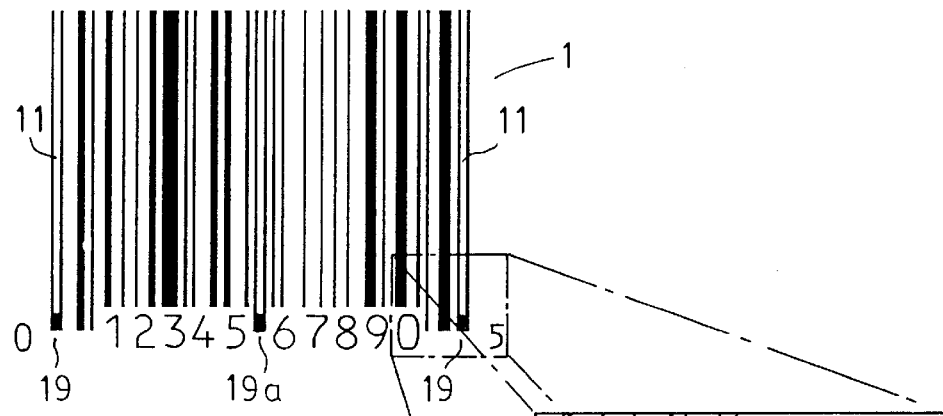
FIG. 7 shows an out-of-tolerance normally printed barcode of FIG. 5, including a detail of the same verification pattern.

FIG. 5 shows a film-master using alternative verification patterns suitable for normally printed barcodes. In the verification patterns 19 and 19a, wedges 21 and 21a are produced as spaces between downward extensions of a pair of guard bars 11 or 9 by locating an inclined bar 23 between the guard bars. Except that it is the bars that spread, and the spaces which are subject to line width reduction, the dimensions of the wedges and the principles of operation are exactly as described for the previous embodiment. FIGS. 6 and 7 illustrate barcodes reproduced from the master of FIG. 5, and indicating correct reproduction and excessive line spread respectively.

Figure 8:
FIG. 8 is a film-master for a normally printed barcode in accordance with a further embodiment of the of the present invention, including a detail of one verification pattern.
Figure 8:
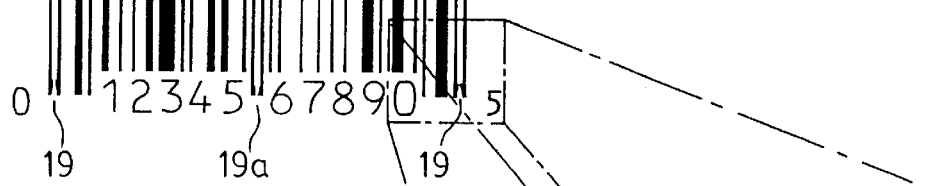

FIG. 8 shows a further alternative embodiment of a film-master using alternative forms of the verification patterns 19 and 19a In this instance, the lower ends of the guard bars 11 or 9 are thickened as at 25 so as to define a single wedge shaped space 21 in each verification pattern. In other respects, operation is similar to that of the previous embodiment, with the wedge in the patterns 19 extending through thicknesses $T_1$, $T_2$, and $T_3$.

Figure 9:
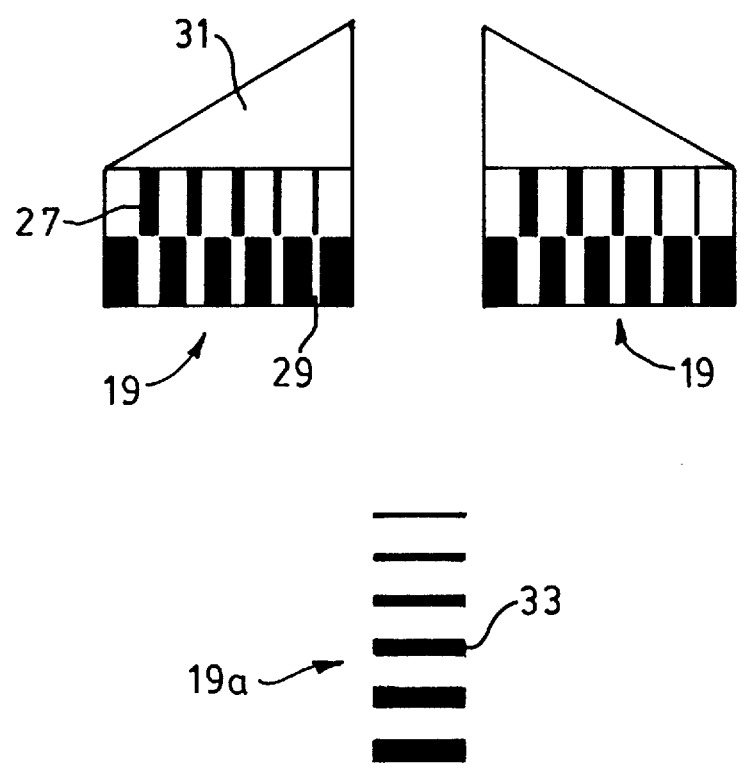
FIG. 9 shows an alternate set of verification patterns for employment at the bottom corner and bottom centre of a U.P.C. barcode in accordance with a further embodiment of the invention.

Referring to FIG. 9, showing yet a further style of verification pattern, the wedges can be formed as step wedges formed by parallel spaced bar or space segments rather than conventional wedges. The patterns 19 comprise step wedges of both bar segments 27 of graded width, and space segments of graded width, associated with a triangular framed area 31 which can be utilized to contain a trademark. This last feature may also be utilized in conjunction with the previously described embodiments.

The patterns 19 are located at bottom corners of the code, outside of the scanning area. A centre pattern 19a consists of a step wedge of graded bar segments 33 which has the same function as the previously described patterns 19a. The ranges of widths of the bar segments in the master (for a reverse printed code) are structured on similar principles to those adopted in the previous embodiments.

While not shown herein, it is recognised that many other verification patterns can be developed following the guidelines disclosed herein. For instance, it is possible to substitute the illustrated wedge shapes with other figures of progressively changing width providing equivalent functionality. Moreover, the verification patterns may be alternatively located, particularly in barcodes other than UPC codes which may not have features delimiting quiet zones adjacent the code. For example, they may be used to delimit quiet zones 13 adjacent a barcode, as shown at the tops and bottoms of the broken lines delimiting these zones in FIG. 1.

It will be appreciated that the pattern configurations and locations described and illustrated are exemplary only, and may be varied within the scope of the invention as defined in the appended claims to meet the needs of industry and conventions and regulations as to placement of elements within barcodes.

I claim:

1. A master for the production of scannable barcodes comprising a scannable area of parallel bars and spaces and requiring the maintenance of bar and space widths within a predetermined tolerance after reproduction by a process in which one of the bars and spaces is subject to spreading resulting in encroachment upon the other of the bars and the spaces, said master including, adjacent the scannable area, at least one verification pattern including a first component, corresponding to whichever of bars and spaces is subject to encroachment, bounded by a second component, corresponding to whichever of bars and spaces is subject to spreading, the first component being at least one wedge having portions with widths graded through a range of widths such that, during reproduction, spreading of the second component to a degree within a predetermined range will shorten the wedge to an extent indicative of the degree of spreading, whereby an abnormal extent of shortening of the wedge provides a visual indication of abnormal reproduction.

2. A master according to claim 1, including at least one first verification pattern in which the range of widths through which the first component is graded extends from a degree of ink spreading allowed for in the master to the sum of the tolerance and the degree of ink spread allowed for in the master.

3. A master according to claim 1, including a verification pattern in which the range of widths through which the first component is graded extends through a range of acceptable degrees of ink spread of the second component, centred on said allowed for degree of ink spread.

4. A master according to claim 2, including an additional verification pattern in which tie range of widths through which the first component is graded extends through a range of acceptable degrees of ink spread of the second component, centred on said allowed for degree of ink spread.

5. A master according to claim 4, for an UPC code, including two frost verification patterns at bottom corners of the code, outside of a scannable area, and said additional verification code at bottom centre of the code, also outside the scannable area.

6. A master according to claim 1, wherein the first component comprises at least one tapered wedge bounded to either side by portions of the second component.

7. A master according to claim 1, wherein the second component comprises first and second portions with spaced parallel facing edges, and a third portion between the first and second portions with parallel edges inclined relative to the facing edges of the first and second portions so as to define two tapering portions of the first component respectively between said first and third portions and between such second and third portions of the second component.

8. A master according to claim 1, wherein the first component comprises multiple parallel portions having successively increasing widths, separated by multiple portions of said second component.

9. A master according to claim 1, wherein verification patterns are placed to demarcate quiet zones adjacent a barcode.

10. A master according to claim 1, including a row of numerical data extending along one edge of the barcode perpendicular to the bars and spaces, wherein verification patterns are placed at either end of the row.

11. A master according to claim 10, including a verification pattern placed in the middle of the row.

12. A master according to claim 6, including verification patterns in which the first component includes wedges tapering in opposite directions.

13. A master according to claim 1, wherein the verification pattern is associated with an area reserved for receiving a trade-mark.

14. A barcode reproduced from a master according to claim 1.

15. A barcode reproduced from a master according to claim 2.

16. A barcode reproduced from a master according to claim 4.

17. A barcode reproduced from a master according to claim 5.

18. A barcode reproduced from a master according to claim 6.

19. A barcode reproduced from a master according to claim 7.

20. A barcode reproduced from a master according to claim 8.

* * * * *